United States Patent [19]
Nakatani et al.

[11] Patent Number: 5,919,898
[45] Date of Patent: Jul. 6, 1999

[54] ABSORBENT FOR REMOVING INTERLEUKINS AND TUMOR NECROSIS FACTOR, AND PROCESS FOR REMOVING THE SAME

[75] Inventors: Masaru Nakatani; Shigeo Furuyoshi; Satoshi Takata, all of Kobe, Japan

[73] Assignee: Kanegafuchi Kagaku Kogyo Kabushiki Kaisha, Osaka, Japan

[21] Appl. No.: 08/590,599

[22] Filed: Jan. 24, 1996

[30] Foreign Application Priority Data

| Jan. 27, 1995 | [JP] | Japan | 7-012082 |
| Mar. 24, 1995 | [JP] | Japan | 7-066565 |
| Mar. 30, 1995 | [JP] | Japan | 7-061182 |

[51] Int. Cl.$^6$ ................................. A61K 38/00
[52] U.S. Cl. ................. 530/345; 530/412; 530/351
[58] Field of Search ................. 530/351, 345, 530/412

[56] References Cited

U.S. PATENT DOCUMENTS

| 4,721,730 | 1/1988 | Furuyoshi et al. | 521/53 |
| 4,770,781 | 9/1988 | Schmidt et al. | 530/351 |
| 4,801,686 | 1/1989 | Kronheim | 530/351 |
| 4,894,333 | 1/1990 | Cerretti et al. | 435/70 |
| 5,278,284 | 1/1994 | Lusk et al. | 530/305 |
| 5,437,861 | 8/1995 | Okarma et al. | 424/78.08 |
| 5,484,887 | 1/1996 | Kronheim et al. | 530/351 |

FOREIGN PATENT DOCUMENTS

| 0 247 592 A3 | 12/1987 | European Pat. Off. |
| 0 426 857 A1 | 5/1991 | European Pat. Off. |
| 0 592 989 A3 | 4/1994 | European Pat. Off. |

OTHER PUBLICATIONS

Freifelder, "Physical Biochemistry" (2nd Edition) pp. 262–263 W.H. Freeman + Co., New York, 1982.
Patent Abstracts of Japan; JP 2 017 942, Jan. 22, 1990; vol. 14, No. 146; Suzuki et al. (Abstract).
Journal of Chromatography, XP 000568010; "Isolation of Proteins from Crude Mixtures . . . ", 296 (1984) pp. 277–284, R.A. Wolfe et al.
Circulatory Shock, 38:264–274 (1992); "Two Types of Septic Shock Classifed by the Plasma Levels of Cytokines and Endotoxins", Wiley–Liss, Inc.
Chemical Reviews, vol. 71, No. 6 (Dec. 1971); "Partition Coefficients and Their Uses", Leo et al.
R.F. Rekker; "The Hydrophobic Fragmental Constant", vol. 1, 1977.
Menekiyakuri, vol. 12, No. 1, pp. 15–21, 1994 (with partial Translation).

*Primary Examiner*—Johann Richter
*Assistant Examiner*—Patrick R. Delaney
*Attorney, Agent, or Firm*—Armstrong, Westerman, Hattori, McLeland & Naughton

[57] ABSTRACT

An adsorbent for removing at least one interleukin selected from the group consisting of inerleukin-1, interleukin-2, interleukin-6 and interluekin-8 and/or TNF, which comprises a porous water-insolube carrier and a compound satisfying the value of log P of at least 2.50, in which P is a distribution coefficient in an octanol-water system and being immobilized onto the carrier, a process for removing the above IL(s) and/or TNF by the adsorbent and an adsorber comprising the adsorbent. According to the present invention, IL(s) and TNF in body fluid can be efficiently absorbed using the above-mentioned adsorbent.

5 Claims, 2 Drawing Sheets

ABSORBENT FOR REMOVING INTERLEUKINS AND TUMOR NECROSIS FACTOR, AND PROCESS FOR REMOVING THE SAME

BACKGROUND OF THE INVENTION

The present invention relates to an adsorbent for removing from body fluid at least one interleukin (hereinafter referred to as "IL") selected from the group consisting of interleukin-1 (hereinafter referred to as "IL-1"), interleukin-2 (hereinafter referred to as "IL-2"), interleukin-6 (hereinafter referred to as "IL-6") and interleukin-8 (hereinafter referred to as "IL-8"); a method for removing the above-mentioned IL(s) in body fluid by means of the above-mentioned adsorbent; an adsorber for removing the above-mentioned IL(s) by means of the above-mentioned adsorbent; an adsorbent for removing tumor necrosis factor (hereinafter referred to as "TNF"); a method for removing TNF from body fluid by means of the above-mentioned adsorbent; and an adsorber for removing TNF by means of the above-mentioned adsorbent.

An immunocompetent cell produces various kinds of active substances when causing immune response. One portion thereof is a proteinous substance called a cytokine and plays a greatly important role as a biophylactic factor which is closely related to various kinds of antigen-specific response and/or non-specific inflammatory response. Essentially, a cytokine is necessary and indispensable for maintaining biological homeostasis and is produced excessively in pathological conditions such as inflammation and the like, relating to the formation and the prolongation of inflammation and the like.

IL-1, the gene thereof was cloned in from 1984 to 1985, is a proteinic factor having a molecular weight of about 17 kD which is produced mainly from cells of the monocyte/macrophage lineage. As IL-1, there exist IL-1α and IL-1β which are originated from different genes, respectively. The activated macrophage produces IL-1 α and IL-1β in a IL-1α: IL-1β ratio of about 1: 9.

It has been made clear that IL-1 plays an important role in all kinds of biological reactions such as immune, inflammation, hematopoiesis, secretion in the nerve, biological homeostasis and the like. Contrary to this, it has been shown that an abnormal production of IL-1 causes various kinds of diseases. For example, there is autoimmune disease as one of the diseases and it has been shown that IL-1 relates to the formation of inflammation of connective tissue diseases causing a systemic chronic inflammation and, among them, particularly to the formation of inflammation of rheumatoid arthritis (hereinafter referred to as "RA"). IL-1 has a cartilage destroying function by causing overproduction of prostaglandins and collagenase from synovial cells and chondrocytes, and a bone resorbing function by causing activation of osteoclasts, and it has been strongly shown that there is a possibility that IL-1 relates to the formation of rheumatoid joints. Then, it has been reported that when IL-1 is injected into a cavitus articulare of a treated animal, fugitive arthrisis can be reappeared. And, it has been shown that IL-1 plays a leading role in the pathogenesis of RA. Further, in recent years, the followings have been reported; in diseases which are included by the concept such as systemic inflammatory response syndrome (hereinafter referred to as "SIRS"), inflammatory cytokines such as IL-1 and the like are produced excessively, and the systemic inflammatory response proceeds mainly because of functions of these cytokines; then, tissular disorders and failures of many organs occur and, sometimes, a death is caused. Further, a higher concentration of IL-1 has been detected in an inflammatory site or in peripheral blood of a patient with lupus erythematosus, Lyme disease, osteoporosis, Kawasaki disease, gouty arthritis, endometritis or premature labor than that of a normal human, and it has been shown that IL-1 relates closely to the formation of the above-mentioned inflammation in these diseases. Further, it has been shown that IL-1 is produced in a patient on dialysis because of various kinds of factors, and that IL-1 relates closely to the pathogenesis of dialytic complications including dialysis related amyloidosis. Also, IL-1 has a function for accelerating the production of other cytokines in addition to the above-mentioned functions, and it is confirmed that IL-1 is a main causative substance of vicious circle in inflammation. Though IL-1 relates closely to the inflammation of each kind of diseases, the present situation is that any effective method of inhibiting the functions of IL-1 or of removing IL-1 from body fluid of patients with the above-mentioned diseases has not been established.

Also, IL-2 is an active factor found by Morgan et al in 1976 as T cell growth factor (TCGF) capable of maintaining T cell for a long term, from an activated culture medium obtained by culturing lymphocytes of peripheral blood with an antigen, mitogen or the like. It has been gradually made clear in later researches that this active factor has an activity to accelerate the division of a thymocyte, to activate a cytotoxic T cell, to derive the differentiation of a B cell, to activate a natural killer (NK) cell, and to derive an activity of a lymphokine activated killer (LAK). The TCGF was named IL-2 uniformly in 1979. And then, the gene of IL-2 was cloned by Taniguchi et al in 1983 and the primary structure thereof was made clear.

IL-2 is produced mainly by a T cell, acts on cells with IL-2 receptor (IL-2R) on the surface thereof, such as a T cell, a B cell, a NK cell, a monocyte, a macrophage, a glioma cell and the like, and has various functions to cause proliferation, differentiation, activation and the like of the above-mentioned cells. It has been shown, however, that an abnormal production of IL-2 has a harmful function on a living body. For example, it is known that a cytokine exists in blood of a patient with sepsis in an abnormally high concentration. When sepsis becomes serious, the so-called "septic shock" occurs. This septic shock can be classified to two types. As one type, it has been reported that IL-2 exists in an abnormally high concentration and relates to the formation of inflammation thereof (refer to S. Endo et al, Circulatory Shock, 38, pages 264–274 (1992)). Also, it has been reported that among septic shocks, the septic shock to which IL-2 relates has a bad prognosis. As described in the above, though IL-2 relates closely to the formation of septic shock, the present situation is that any method of inhibiting the functions of IL-2 or of removing IL-2 from body fluid has not been established.

Further, IL-6 was isolated and purified by Kishimoto et al in 1985 as a factor to derive only the production of antibody without causing the acceleration of proliferation of an activated B cell. And, IL-6 is a cytokine of which cDNA was isolated and of which whole base sequence was determined by Hirano et al in 1986.

IL-6 has many biological activities, for example, to cause the derivation of the production of acute phase protein in an immunocompetent cell and a hepatic cell.

IL-6 is produced from each kind of various cells such as a monocyte, a fibroblast, an angioendothelial cell and a skin keratinocyte when the stimulation of various kinds of inflammatory substances including lipopolysaccharide (LPS) are added thereto. And, therefore, chronic inflammatory response occurs by an overproduction of IL-6 because IL-6 has a function for enhancing the inflammatory response. For example, it has been reported that IL-6 is produced by a B lymphoblast in centroblast of enlarged lymph nodes of Castleman disease, and the improvement of clinical symptom and the decrease of serum level of IL-6 are caused by a surgical removal of the lesional lymph nodes. In further recent years, it has been reported that in diseases included by the above-mentioned concept SIRS, the concentration of inflammatory cytokines such as IL-6 in blood is high, and systemic inflammatory response proceeds mainly because of these functions similarly in the case of IL-1, then tissular disorders and failures of many organs occur and, sometimes, a death is caused. An abnormally higher concentration of IL-6 is detected in an inflammatory site or in peripheral blood of a patient with autoimmune diseases such as RA, systemic lupus erythematosus, chronic diseases with proliferation such as mesangial nephritis and psoriasis and, further, dialytic complications such as dialysis related amyloidosis than in that of a normal human. And, it is considered that IL-6 relates closely to the formation of inflammation of those diseases. It is, however, the present situation is that any effective method of inhibiting the functions of IL-6 in body fluid or of removing IL-6 from body fluid has not been established.

IL-8 is a cytokine purified as monocyte-derived neutrophil chemotactic factor (MDNCF), and gene thereof was also cloned by Matsushima et al in 1987. According to later researches, IL-8 has chemotaxis not only to a neutrophil but also to a basophil and at T lymphocyte. IL-8 is produced by various kinds of cells such as a monocyte, a macrophage, a fibroblast, an angioendothelial cell, a chondrocyte and the like.

The infiltration of a neutrophil and a lymphocyte can be reappeared even in vivo by intracutaneous/subcutaneous and intra-articular administration of IL-8.

To maintain the administration of a large amount of IL-8 is remarkably harm to tissues, and causes the destruction of tissues of adult respiratory distress syndrome in an alveolus and the destruction with the infiltration of a large amount of lymphocytes in an arthrosis. Experimentally, IL-8 relates essentially to the infiltration of a neutrophil in dermatitis derived by lipopolysaccharide and during reperfusion after ischemia. And, it has been proved that the destruction of tissues can be almost completely inhibited by a neutralizing antibody against IL-8. Further, an abnormally higher concentration of IL-8 has been detected in an inflammatory site or in peripheral blood of a patient with diseases such as RA, gouty arthritis, psoriasis, contact dermatitis, idiopathic fibroid lung, adult respiratory distress syndrome, inflammatory bowel disease, immune angiitis, glomerular nephritis, urinary tract infection, cardiac infarction, asthma, respiratory tract infection, perinatal infectious disease, rejection in organ transplantation and the like, than in that of a normal human (refer to Menekiyakuri, 12, No. 1, pages 15–21 (1994)). In further recent years, it has been reported that in diseases included by the above-mentioned concept SIRS, the concentration of inflammatory cytokines such as IL-8 in blood is high, and systemic inflammatory response proceeds mainly because of those functions similarly to in the cases of IL-1 and IL-6, and then tissular disorders and failures of many organs occur and, sometimes, a death is caused. Further, IL-8 is produced in a patient on dialysis because of various kinds of factors, and it has been shown that IL-8 relates closely to the pathogenesis of dialytic complications including dialysis related amyloidosis. It is, however, the present situation is that any effective method of inhibiting the functions of IL-8 in body fluid or of removing IL-8 from body fluid has not been established.

Then, TNF can be mainly classified into a tumor necrosis factor originated from cells of the monocyte/macrophage lineage (hereinafter referred to as "TNFα") and into a tumor necrosis factor originated from a lymphocyte (hereinafter referred to as "TNFβ"). It was reported by Carswell et al in 1975 that TNFα was found as a biologically active substance which appears in blood when *Bcillus Calmette-Guerin* (BCG) was administered to a CD-1 Swiss mouse and, then, after two weeks a bacterial mitogen was administered. The amino acid sequence thereof was made clear by Aggarwa et al. Also, the amino acid sequence and gene arrangement of human TNFα were made clear by Pennica et al, Shirai et al and Wang et al in 1985. TNFβ was reported by Granger et al in 1968 as a factor which gives damage not to a normal cell but only to a tumor cell or as a factor which inhibits the growth of a tumor cell. And, human-type cDNA of TNFβ was cloned and the structure thereof was determined by Gray et al in 1984. Though TNFβ was also called lymphotoxin (LT), TNFβ has been called TNFβ because TNFβ has about 30% of homology to TNFα. Though both of TNFα and TNFβ bind to the same receptor and it is considered that they have an approximately same activity, TNFα has a higher activity and a slightly different activity has been found between them recently.

According to the recent researches, it has been made clear that the effect of TNF relates not only to antineoplastic activity but also to immune, inflammation, fat metabolism, coagulating and fibrinolysis cascades, hemopoiesis and the like. From the researches until now an abnormally higher concentration of TNF is detected in an inflammatory site or in peripheral blood of a patient with a disease such as RA or arteriosclerosis than in that of a normal human. And the relation between TNF and these diseases has been shown. In further recent years, in diseases included by the above-mentioned concept SIRS, an inflammatory cytokine such as TNF or the like is produced excessively, a systemic inflammatory response proceeds mainly because of these functions, and then tissular disorders and failure of many organs occur and, sometimes, a death is caused. Further, TNF is produced in a patient on dialysis because of various kinds of factors, and it has been shown that TNF relates closely to the pathogenesis of dialytic complications including dialysis related amyloidosis. Also, in addition to the above-mentioned functions, TNF has a function for accelerating the production of other cytokines and is considered to be a main causative substance of the vicious circle of an inflammatory site. It is, however, the present situation is that any effective method of inhibiting the effect of TNF in body fluid or of removing TNF from body fluid has not been established.

In order to efficiently adsorb at least one IL selected from the group consisting of IL-1, IL-2, IL-6 and IL-8 which are present in body fluid and efficiently adsorb TNF which is present in body fluid, an adsorbent which can adsorb the above-mentioned IL(s) and an adsorbent which can adsorb TNF were studied. As a result, it was found that a material which comprises a porous water-insoluble carrier and a compound satisfying the value of log P of at least 2.50, in which P is a distribution coefficient in an octanol-water system, and being immobilized onto the carrier, can efficiently adsorb the above-mentioned IL(s) and TNF in body fluid. Then, the present invention has been accomplished.

An object of the invention is to provide an adsorbent which can efficiently adsorb at least one IL selected from the group consisting of IL-1, IL-2, IL-6 and IL-8 which are present in body fluid.

A further object of the invention is to provide a process for removing the above-mentioned IL(s) in body fluid by means of the above-mentioned adsorbent.

A still further object of the invention is to provide an adsorber for removing the above-mentioned IL(s) by means of the above-mentioned adsorbent.

Another object of the invention is to provide an adsorbent which can efficiently adsorb TNF in body fluid.

A further another object of the invention is to provide a method for removing TNF in body fluid by means of the above-mentioned adsorbent.

A still further another object of the invention is to provide an adsorber for removing TNF by means of the above-mentioned adsorbent.

These and the other objects of the present invention will become apparent from the description hereinafter.

SUMMARY OF THE INVENTION

In accordance with the present invention, there is provided an adsorbent for removing at least one interleukin selected from the group consisting of interleukin-1, interleukin-2, interleukin-6 and interleukin-8, which comprises a porous water-insoluble carrier and a compound satisfying the value of log P of at least 2.50, in which P is a distribution coefficient in an octanol-water system and being immobilized onto the carrier; a process for removing at least one interleukin selected from the group consisting of interleukin-1, interleukin-2, interleukin-6 and interleukin-8 in body fluid, which comprises bringing the body fluid into contact with an adsorbent for removing at least one interleukin selected from the group consisting of interleukin-1, interleukin-2, interleukin-6 and interleukin-8, which comprises a porous water-insoluble carrier and a compound satisfying the value of log P of at least 2.50, in which P is a distribution coefficient in an octanol-water system and being immobilized onto the carrier; and an adsorber for removing at least one interleukin selected from the group consisting of interleukin-1, interleukin-2, interleukin-6 and interleukin-8, wherein a container having an inlet and an outlet for fluid is charged with an adsorbent for removing at least one interleukin selected from the group consisting of interleukin-1, interleukin-2, interleukin-6 and interleukin-8, which comprises a porous water-insoluble carrier and a compound satisfying the value of log P of at least 2.50, in which P is a distribution coefficient in an octanol-water system and being immobilized onto the carrier, and is equipped with a means preventing the adsorbent from effusing outside of the container.

Further, according to the present invention, there is provided an adsorbent for removing tumor necrosis factor, which comprises a porous water-insoluble carrier and a compound satisfying the value of log P of at least 2.50, in which P is a distribution coefficient in an octanol-water system and being immobilized onto the carrier; a process for removing tumor necrosis factor in body fluid, which bringing the body fluid into contact with an adsorbent for removing tumor necrosis factor, which comprises a porous water-insoluble carrier and a compound satisfying the value of log P of at least 2.50, in which P is a distribution coefficient in an octanol-water system and being immobilized onto the carrier; and an adsorber for removing tumor necrosis factor, wherein a container having an inlet and an outlet for fluid is charged with an adsorbent for removing tumor necrosis factor, which comprises a porous water-insoluble carrier and a compound satisfying the value of log P of at least 2.50, in which P is a distribution coefficient in an octanol-water system and being immobilized onto the carrier, and is equipped with a means preventing the adsorbent from effusing outside of the container.

Preferably, in the above-mentioned adsorbent for removing the above-mentioned IL(s), the porous water-insoluble carrier has a molecular weight of exclusion limit measured with globular proteins from $5 \times 10^3$ to $6 \times 10^5$.

Also, preferably, in the above-mentioned adsorbent for removing TNF, the porous water-insoluble carrier has a molecular weight of exclusion limit measured with globular proteins from $1 \times 10^4$ to $6 \times 10^5$.

DETAILED DESCRIPTION

Figure 1:
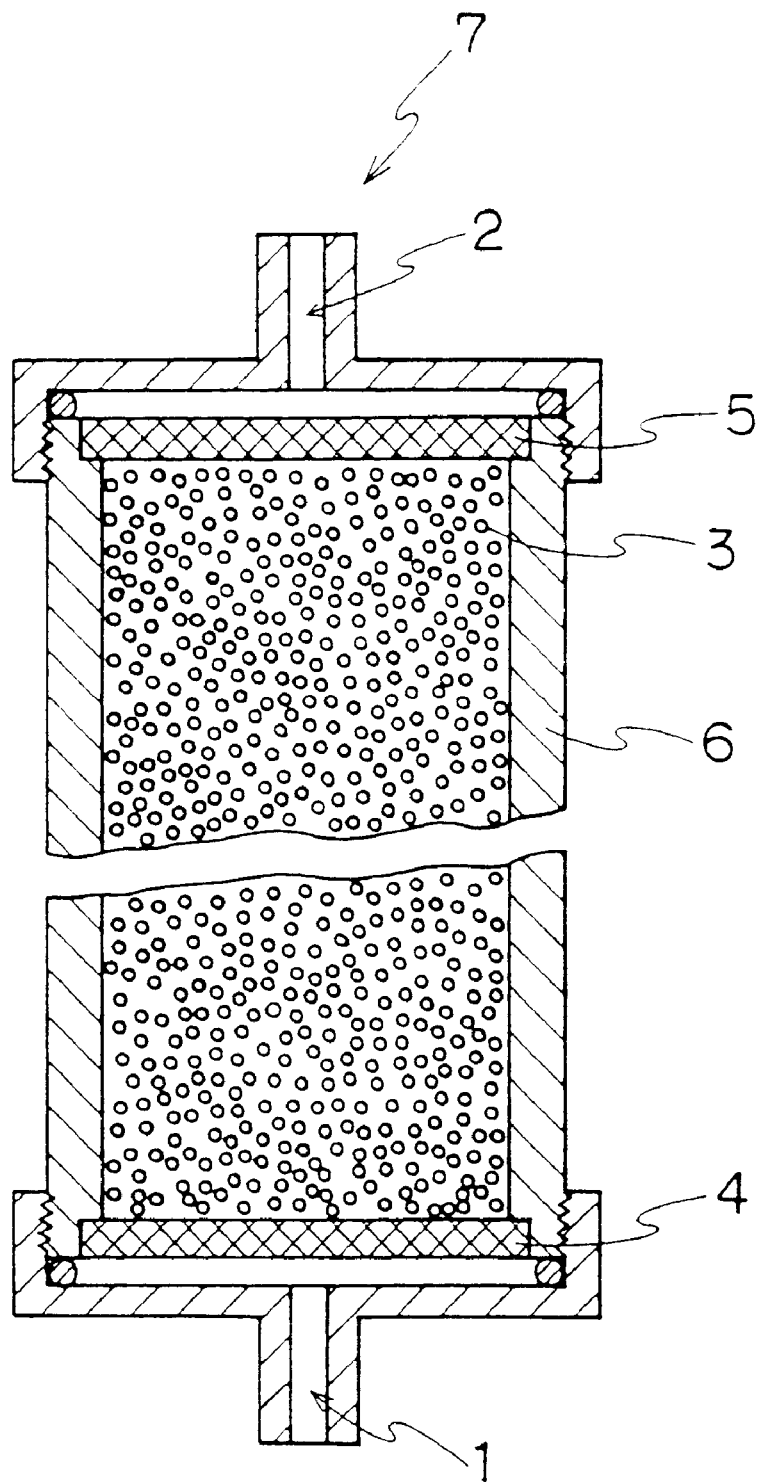
FIG. 1 is a section showing an outline of an example of the adsorber of the present invention.

The term "body fluid" in the present invention means blood, plasma, serum, ascites, lymph, synovia, a fraction component obtained from these fluids, and another liquid component derived from a living body.

In the adsorbent of the present invention, a compound having the log P value of at least 2.50 is immobilized onto a porous water-insoluble carrier.

The value of log P is a hydrophobic parameter of a compound, the distribution coefficient P in an octanol-water system is obtained according to the following typical method. First of all, a compound is dissolved in octanol (or water) and an equal volume of water (or octanol) is added thereto. After shaking for 30 minutes by Griffin flask shaker (made by Griffin & George Ltd.), it is centrifuged for from 1 to 2 hours at 2000 rpm. Then concentrations of the compound in both octanol and water layers are measured by various methods such as spectroscopic method and GLC, and the value of P is obtained according to the following formula:

$$P = C_{oct}/C_w$$

Coct: concentration of a compound in an octanol layer

Cw: concentration of a compound in a water layer

Until now, many investigators have measured values of log P of various compounds and the found values were put in order by C. Hansch et al (refer to "PARTITION COEFFICIENTS AND THEIR USES"; Chemical Reviews, 71, page 525 (1971)).

As to the compounds whose found values are unknown, the calculated values using a hydrophobic fragmental constant f (such value hereinafter referred to as "Σf"), shown in "THE HYDROPHOBIC FRAGMENTAL CONSTANT" (Elsevier Sci. Pub. Com., Amsterdam, 1977) written by R. F. Rekker, can be a good guide. It has been reported that a hydrophobic fragmental constant f shows the hydrophobicity of various fragments, which are determined by a statistical management of many found values of log P, and the total of f of each fragment which is a constituent of one compound almost corresponds to log P.

In the present invention, a compound to be immobilized onto a porous water-insoluble carrier can be employed without particular limitation, provided that the compound satisfies that the value of log P is at least 2.50. However, because a part of a compound is often eliminated in case of binding a compound onto a carrier by chemical binding method, when an eliminated group greatly contributes to hydrophobicity of the compound, that is to say, when hydrophobicity of atomic group which is immobilized onto the carrier becomes smaller than $\Sigma f=2.50$ by elimination, such compound is not suitable as the compound used in the present invention in viewpoint of the purpose of the present invention.

One example case using such unsuitable compound is the case when isopentyl benzoate ($\Sigma f=4.15$) is immobilized onto the carrier having hydroxyl group by esterification. In that case, the atomic group which is practically immobilized onto the carrier is $C_6H_5$—CO—, the $\Sigma f$ of this atomoic group is 1 or less than 1. Whether such compound is sufficient as a compound used in the present invention or not may be determined depending on whether the value of log P, when an elimination part of the group is substituted by hydrogen, is at least 2.50 or not.

Among the compounds satisfying that the value of log P is at least 2.50, it is preferable to use compounds having a functional group which can be utilized for binding the compound onto the carrier, such as an unsaturated hydrocarbon, an alcohol, an amine, a thiol, a carboxylic acid and a derivative thereof, a halide, an aldehyde, a hydrazide, an isocyanate, a compound containing an oxirane ring such as a glycidyl ether and a silane halide.

Representative examples of such compound are, for instance, amines such as n-heptylamine, n-octylamine, decylamine, dodecylamine, hexadecylamine, octadecylamine, 2-aminooctene, naphthylamine, phenyl-n-propylamine and diphenylmethylamine, alcohols such as n-heptyl alcohol, n-octyl alcohol, dodecyl alcohol, hexadecyl alcohol, 1-octene-3-ol, naphthol, diphenylmethanol and 4-phenyl-2-butanol, glycidyl ethers obtained from these alcohols, carboxylic acids such as n-octanoic acid, nonanoic acid, 2-nonenoic acid, decanoic acid, dodecanoic acid, stearic acid, arachidonic acid, oleic acid, diphenylacetic acid and phenylpropionic acid, carboxylic acid derivatives such as halides, esters and amides of these carboxylic acids, halides such as octyl chloride, octyl bromide, decyl chloride and dodecyl bromide, thiols such as octanethiol and dodecanethiol, silane halides such as n-octyltrichlorosilane and octadecyltrichlorosilane, aldehydes such as n-octylaldehyde, n-caprinaldehyde and dodecylaldehyde, and the like.

As compounds other than these, according to the present invention, there can be used compounds in which a substituent containing a heteroatom such as a halogen, nitrogen, oxygen or sulfur, or other alkyl group is substituted for hydrogen atom contained in hydrocarbon moiety of the above-exemplified compounds, and which satisfies that the value of log P is at least 2.50 or has the value of log P shown in the table on pages 555–613 in the above-mentioned review by C. Hansch of "PARTITION COEFFICIENTS AND THEIR USES; Chemical Reviews, 71, page 525 (1971)" being at least 2.50. However, the present invention is not limited to these compounds.

These compounds may be used alone or in admixture thereof. Further, these compounds may be combined with a compound satisfying that the value of log P is less than 2.50.

The term "water-insoluble carrier" in the adsorbent of the present invention means a carrier which is solid and water-insoluble at ordinary temperature and ordinary pressure.

As a water-insoluble carrier used in the present invention, there are an inorganic carrier such as glass beads or silica gel; a synthetic polymer such as crosslinked-polyvinyl alcohol, crosslinked-polyacrylate, crosslinked-polyacrylamide or crosslinked-polystyrene and an organic carrier which comprises of polysaccharide such as crystalline cellulose, crosslinked-cellulose, crosslinked-agarose or crosslinked-dextran, furthermore, a composite carrier obtained from a combination of the above-mentioned compounds such as organic-organic carrier and organic-inorganic carrier. Particularly, a hydrophilic carrier is preferable, because non-specific adsorption on the hydrophilic carrier is relatively poor and good selectivity of adsorption for IL(s) and TNF can be obtained.

The term "hydrophilic carrier" used in the present invention means a carrier which has at most 60 degrees of contact angle of a compound which constitutes the carrier with water, in case the compound is allowed to form a flat plate. As representative examples of such carrier, there are a carrier comprised of cellulose, and a carrier comprised of polyvinyl alcohol, hydrolyzed poly(ethylene-vinyl acetate), polyacrylamide, polyacrylic acid, polymethacrylic acid, poly (methyl methacrylate), polyacrylic acid-grafting polyethylene, polyacrylamide-grafting polyethylene or glass.

A carrier comprised of porous cellulose gel is one of the most preferable carriers employed in the present invention, because porous cellulose gel has the following excellent properties:

1. The gel has relatively high mechanical strength and toughness, and as a result of such properties the gel is hardly destroyed or produce fine dividing powder by an operation such as stirring, and when a column is charged with the gel, the gel is not consolidated or clogged up by passing body fluid through the column at high flow rate. Therefore, it is possible to pass body fluid through the column at high flow rate. Furthermore, the structure of pore thereof hardly changes by high-pressure steam sterilization,
2. the gel is comprised of cellulose, so that the gel is hydrophilic, the gel has a large amount of hydroxyl group which can be employed for bonding ligand and non-specific adsorption is scarcely caused,
3. the gel has relatively high strength, even if volume of porosity thereof is enlarged, thus capacity of adsorption thereof which is not inferior to that of soft gel is obtained and
4. safety of the gel is higher as compared with that of a synthetic polymer gel and the like.

The present invention is not limited to only those carriers. Further, those carriers may be used alone or in admixture thereof.

The following is a porous structure of the carrier. In view of the ability of adsorption per unit volume of the gel, a structure uniformly having pores at any part of the gel is more preferable than a structure having pores only on the surface of the gel. It is preferred that pore volume of the gel is at least 20 % and that specific surface area of the gel is at least 3 $m^2/g$. And form of the carrier can be selected from any type of form such as granular, plate, fibrous or hollow type. Also, size of the carrier is not limited.

Furthermore, it is suitable for immobilizing ligand if a functional group which can be used for immobilizing reaction of ligand is present on the surface of the carrier. As a representative examples of those functional groups, there are hydroxyl group, amino group, aldehyde group, carboxyl group, thiol group, a silanol group, an amide group, epoxy group, a halogen group, succinylimide group and an acid anhydride group. However, the ligand is not limited to those.

As a carrier used in the present invention, there can be used any one of a hard carrier and a soft carrier, in order to use the carrier for extracorporeal circulation treatment it is important that the gel does not clog up when a column is charged with the carrier and a liquid is passed through the column. Therefore, the gel is required to have sufficient mechanical strength. Thus it is more preferable that the carrier used in the present invention is a hard carrier. The term "hard carrier" used in the present invention means, for instance, in case that a gel is granulated gel as shown in Reference Example described below, the carrier wherein a relation between pressure loss $\Delta P$ and flow rate is linear relation up to 0.3 kg/cm$^2$ of pressure loss when a cylindrical column is charged with the gel and aqueous fluid is passed through the column. The adsorbent of the present invention is obtained by immobilizing a compound satisfying the value of log P of at least 2.50 onto a porous water-insoluble carrier. As a method of immobilization, various methods which are widely known can be employed without particular limitation.

However, since the adsorbent of the present invention is used for extracorporeal circulation treatment, it is important to suppress desorption and elution of ligand in sterilization or treatment to the utmost from a safety point, thus immobilization by using covalent bond is preferable.

There are various processes for removing a substance to be adsorbed, i.e., the above-mentioned IL(s) and/or TNF by employing the adsorbent of the present invention. The most simple and easy process is a method which comprises being taken out body fluid containing the substance, storing the fluid in a bag, mixing the adsorbent of the present invention therewith, removing the substance, then removing the adsorbent through a filter and returning the fluid into the body.

Another process is a process which comprises charging the adsorbent with a column which has an inlet and an outlet for fluid and is equipped with a means preventing the adsorbent from effusing outside of the column and passing the fluid at the outlet; and then passing body fluid through the column. Both processes can be used. The latter process is easy to perform procedure. By incorporating the adsorbent of the present invention into extracorporeal circulation cycle, the substance to be adsorbed can be efficiently removed with on-line system from body fluid, especially blood in a patient. The adsorbent of the present invention is suitable for this process.

In the extracorporeal circulation cycle described in the present specification, the adsorbent of the present invention can be used alone or in combination with the other extracorporeal circulation treatment system. As an example of the combination, there is a combination with artificial dialysis cycle, and then, the combination can also be used for dialysis therapy.

The adsorber of the present invention with the adsorbent of the present invention is more specifically explained referring to FIG. 1 which is schematic cross section of an example.

In FIG. 1, 1 represents an inlet for body fluid; 2 represents an outlet for body fluid; 3 represents the adsorbent of the present invention; 4 and 5 represent a means (filter) for preventing the adsorbent from flowing out, thereby body fluid and a component contained in body fluid can pass but the adsorbent cannot pass; 6 represents a column; and 7 represents the adsorber of the present invention. The adsorbent of the present invention is not particularly limited to such example. The adsorber of the present invention is not limited, provided that a container having an inlet and an outlet for fluid is charged with the adsorbent of the present invention and equipped with a means preventing the adsorbent from effusing outside of the container.

Examples of the above-mentioned means are, for instance, a filter comprised of mesh, a filter comprised of nonwoven fabric, a filter comprised of cotton flug and the like. A shape and material of the container of the above-mentioned adsorber are not particularly limited.

As a preferable example, there is a transparent or semi-transparent cylindrical column with about 150 to about 400 ml of capacity and about 4 to about 10 cm of diameter. Most preferable column is made of material having sterilization-resistance. Examples of the material are, for instance, glass, polypropylene, vinyl chloride, polycarbonate, polysulfane, poly(methyl pentene) and the like, which are coated with silicone.

The adsorbent of the present invention can remove the above-mentioned IL(s) efficiently, in case of applying the adsorbent of the invention to body fluid of a patient suffering from a disease wherein ILs are produced excessively in comparison with production thereof in normal state, for example, body fluid of a patient suffering from a disease, such as RA, SIRS, systemic lupus erythematosus, Lyme disease, osteoporosis, Kawasaki disease, gouty arthritis, endometritis, premature labor, dialytic complications such as dialysis related amyloidosis, Castleman's disease, chronic disease with proliferation such as mesangial nephritis or psoriasis, contact dermatitis, idiopathic fibroid lung, adult respiratory distress syndrome, inflammatory bowel disease, immune angiitis, glomerular nephritis, urinary tract infection, cardiac infarction, asthma, respiratory tract infection, perinatal infectious disease, rejection in organ transplantation and the like, wherein ILs exist in a high concentration in comparison with concentration thereof in normal state.

The term "IL-1" in the present invention means two kinds of IL-1, i.e., IL-1 α which comprises 159 amino acids and has an isoelectric point of 5 and a molecular weight of about 17,500 and IL-1β which comprises 153 amino acids and has an isoelectric point of from 7 to 8 and a molecular weight of about 17,000. Homology between both structures is low, about 25%. However, both IL-1α and IL-1β bind to the same receptor and show almost the same activity except a part of activities.

The term "IL-2" in the present invention means a protein comprises 133 amino acids and has a molecular weight of about 15,000, and a glycoprotein having sugar chain at Thr (threonine) of the 3rd position from N-terminus which is obtained by O-glycosylation of the above polypeptide.

The term "IL-6" in the present invention means a glycoprotein which comprises 184 amino acids and has a molecular weight of about 26,000. In a molecule of IL-6, two disulfide bonds are contained. It is thought that IL-6 has alpha helix structure in the molecule because of primary structure of IL-6.

The term "IL-8" in the present invention means a protein which comprises 72 amino acids and has a molecular weight of about 8,000, and IL-8 is strongly basic and has an affinity for heparin. Also, secondary and tertiary structure of IL-8 have been made clear by NMR analysis and X-ray crystal structure analysis, and it has been revealed that IL-8 has two disulfide bonds in a molecule and triple-stranded β-sheet structure as bone structure and that the 12 amino acids-residue at C-terminus of IL-8 forms alpha helix structure.

In order to search a compound useful for adsorbing IL(s) selected from the group consisting of IL-1, IL-2, IL-6 and IL-8, compounds having various values of log P were studied by immobilizing them onto the carriers. As a result, it has been found that a compound satisfying that the value of log P is at least 2.50, preferably at least 2.70, more preferably at least 2.90, is useful for adsorbing the above-mentioned IL(s), and that a compound having the value of log P of less than 2.50 hardly has an ability to adsorb the above-mentioned IL(s). It is found that for instance, when an alkylamine is immobilized, where n-hexylamine (log P=2.06) immobilized as an alkylamine is replaced by n-octylamine (log P=2.90), the ability to adsorb the above-mentioned IL(s) remarkably increases by the replacement. From these results, it can be concluded that adsorption of the above-mentioned IL(s) by the adsorbent for removing IL(s) of the present invention is caused by hydrophobic interaction between the above-mentioned IL(s) and atomic group introduced onto a carrier by immobilizing a compound satisfying that the value of log P is at least 2.50 onto the carrier. It is thought that because hydrophobicity of a compound having the value of log P of less than 2.50 is too less, the compound has no ability to adsorb the above-mentioned IL(s).

On the other hand, it is found that when n-octylamine is replaced by cetylamine ($\Sigma f=7.22$) of which hydrophobicity is higher than that of n-octylamine because of a longer alkyl chain in cetylamine, the ability to adsorb ILs further increases. From these results, it can be concluded that adsorption of the above-mentioned ILs by the adsorbent of the present invention is accomplished by immobilizing a compound satisfying that the value of log P is at least 2.50 onto a carrier. It is found that the value of log P is larger, a compound having such value is more preferable as the compound to be used in the present invention. Further, it is thought that a compound having an alkyl chain longer than that of cetylamine and having higher hydrophobicity, e.g., octadecylamine ($\Sigma f=8.28$) is immobilized onto a carrier to adsorb the ILs in the same or more degree in comparison with the case of immobilizing cetylamine onto a carrier.

A property firstly required for a water-insoluble carrier used in the present invention is that the carrier has many pores having a proper size, namely, that the carrier is porous. IL-1 is a protein having a molecular weight of about 17,000, IL-2 is a protein or glycoprotein having a molecular weight of about 15,000, IL-6 is a glycoprotein having a molecular weight of about 26,000, and IL-8 is a protein having a molecular weight of about 8,000, which are an object of adsorption of the adsorbent of the present invention. In order to adsorb these proteins efficiently, it is preferable that the above-mentioned ILs can enter pores of a carrier at a certain high probability, but the other protein does not enter, as much as possible.

In general, a molecular weight of exclusion limit is used as a measure of a molecular weight of a molecule which can enter a pore. The term "a molecular weight of exclusion limit" means the minimum molecular weight of the molecule which cannot enter a pore (i.e., the molecule is excluded) in a gel permeation chromatograph (refer to e.g., Hiroyuki Hatano and Toshihiko Hanai, Experimental High Performance Liquid Chromatography, Kagaku Dojin and the like). Although a molecular weight of exclusion limit for globular proteins, dextran, polyethylene glycol or the like has been quite studied, in the carrier used in the present invention, a molecular weight of exclusion limit measured by employing globular protein is suitably employed.

As the result of the investigation using carriers having various molecular weights of exclusion limit, it is found that a molecular weight of exclusion limit of a pore size suitable for adsorbing the above-mentioned IL(s) is from $5 \times 10^3$ to $6 \times 10^5$. Thus, in case of using a carrier having less than $5 \times 10^3$ of a molecular weight of exclusion limit, the amount of adsorbing the above-mentioned IL(s) is low and practicability of the carrier declines. On the other hand, in case of using a carrier having more than $6 \times 10^5$ of a molecular weight of exclusion limit, the amount of adsorbing proteins (mainly alubumin) other than the IL(s) is high and practicability of the carrier declines in the view point of selectivity. Therefore, preferably a molecular weight of exclusion limit of the carrier used in the present invention is from $5 \times 10^3$ to $6 \times 10^5$, more preferably from $8 \times 10^3$ to $4 \times 10^5$, most preferably from $1 \times 10^4$ to $3 \times 10^5$.

The adsorbent of the present invention can remove TNF efficiently, in case of applying the adsorbent of the present invention to body fluid of a patient suffering from a disease wherein TNF is produced excessively in comparison with production thereof in normal state, for example, body fluid of a patient suffering from a disease, such as RA, arterial sclerosis, SIRS, dialytic complications such as dialysis related amyloidosis and the like, wherein TNF exists in a high concentration in comparison with concentration thereof in normal state.

The term "TNF" in the present invention means two kinds of TNF, i.e., TNFα which comprises 157 amino acids and has a molecular weight of about 17,000 and TNFβ which comprises 171 amino acids and has a molecular weight of about 25,000. Homology between their amino acid sequences is about 30%. It is thought that both form trimers in solutions thereof. TNFα has one disulfide bond in a molecule. TNFβ has no disulfide bond and sugar chain in a molecule.

In order to search a compound useful for adsorbing TNF, compounds having various values of log P were studied by immobilizing them onto the carriers. As a result, it has been found that a compound satisfying that the value of log P is at least 2.50, preferably at least 2.70, more preferably at least 2.90, is useful for adsorbing TNF, and that a compound having the value of log P of less than 2.50 hardly has an ability to adsorb TNF. It is found that for instance, when an alkylamine is immobilized, where n-hexylamine (log P=2.06) immobilized as an alkylamine is replaced by n-octylamine (log P=2.90), the ability to adsorb TNF remarkably increases by the replacement. From these results, it can be concluded that adsorption of TNF by the adsorbent for removing TNF of the present invention is caused by hydrophobic intereaction between TNF and atomic group introduced onto a carrier by immobilizing a compound satisfying that the value of log P is at least 2.50 onto the carrier. It is thought that because hydrophobicity of a compound having the value of log P of less than 2.50 is too less, the compound has no ability to adsorb TNF.

On the other hand, it is found that when n-octylamine is replaced by cetylamine ($\Sigma f=7.22$) of which hydrophobicity is higher than that of n-octylamine because of a longer alkyl chain in cetylamine, the ability to adsorb TNF further increases. From these results, it can be concluded that adsorption of TNF by the adsorbent of the present invention is accomplished by immobilizing a compound satisfying that the value of log P is at least 2.50 onto a carrier. It is found that the value of log P is larger, a compound having such value is more preferable as the compound to be used in the present invention. Further, it is thought that a compound having an alkyl chain longer than that of cetylamine and having higher hydrophobicity, e.g., octadecylamine ($\Sigma f=8.28$) is immobilized onto a carrier to adsorb TNF in the same or more degree in comparison with the case of immobilizing cetylamine onto a carrier.

A property firstly required for a water-insoluble carrier used in the present invention is that the carrier has many pores having a proper size, namely, that the carrier is porous. Among TNFs, TNFα is a protein having a molecular weight of about 17,000 as a monomer and a protein having a molecular weight of about 52,000 as a trimer; TNFβ is a protein having a molecular weight of about 25,000 as a monomer and a protein having a molecular weight of about 75,000 as a trimer, which are an object of adsorption of the adsorbent of the present invention. In order to adsorb these proteins efficiently, it is preferable that TNF can enter pores of a carrier at a certain high probability, but the other protein does not enter, as much as possible.

In general, a molecular weight of exclusion limit is used as a measure of a molecular weight of a molecule which can enter a pore. The term "a molecular weight of exclusion limit" means the minimum molecular weight of the molecule which cannot enter a pore (i.e., the molecule is excluded) in a gel permeation chromatograph (refer to e.g., Hiroyuki Hatano and Toshihiko Hanai, Experimental High Performance Liquid Chromatography, Kagaku Dojin and the like). Although a molecular weight of exclusion limit for globular proteins, dextran, polyethylene glycol or the like has been quite studied, in the carrier used in the present invention, a molecular weight of exclusion limit measured by employing globular protein is suitably employed.

As the result of the investigation using carriers having various molecular weights of exclusion limit, it is found that a molecular weight of exclusion limit of a pore size suitable for adsorbing TNF is from $1 \times 10^4$ to $6 \times 10^5$. Thus, in case of using a carrier having less than $1 \times 10^4$ of a molecular weight of exclusion limit, the amount of adsorbing TNF is low and practicability of the carrier declines. On the other hand, in case of using a carrier having more than $6 \times 10^5$ of a molecular weight of exclusion limit, the amount of adsorbing proteins (mainly alubumin) other than TNF is high and practicability of the carrier declines in the view point of selectivity. Therefore, preferably a molecular weight of exclusion limit of the carrier used in the present invention is from $1 \times 10^4$ to $6 \times 10^5$, more preferably from $2 \times 10^4$ to $4 \times 10^5$, most preferably from $3 \times 10^4$ to $3 \times 10^5$.

The present invention is more specifically described and explained by means of the following Reference Example, Examples and Comparative Examples. It is to be understood that the present invention is not limited to the Examples, and various changes and modifications may be made in the invention without departing from the spirit and scope thereof. In Examples 17 to 20, α type TNF of TNFs was adsorbed. However, β type TNF can be also adsorbed in the same manner as α type TNF.

REFERENCE EXAMPLE

Each of the cylindrical glass columns equipped with the filters having pore size of 15 μm at both ends thereof (inside diameter: 9 mm, length of the column: 150 mm) was charged uniformly with agarose gel (Bio-Gel A-5m made by Bio-Rad Laboratories, a particle size: 50 to 100 meshes), vinyl polymer gel (TSKgel TOYOPEARL HW-65 made by TOSOH Corporation, a particle size: 50 to 100 μm) or cellulose gel (CELLULOFINE GC-700m made by Chisso Corporation, a particle size: 45 to 105 μm), and the relationship between flow rate and pressure loss ΔP was determined by passing water through each of the columns using Peristatic pump. The results are shown in FIG. 2.

Figure 2:
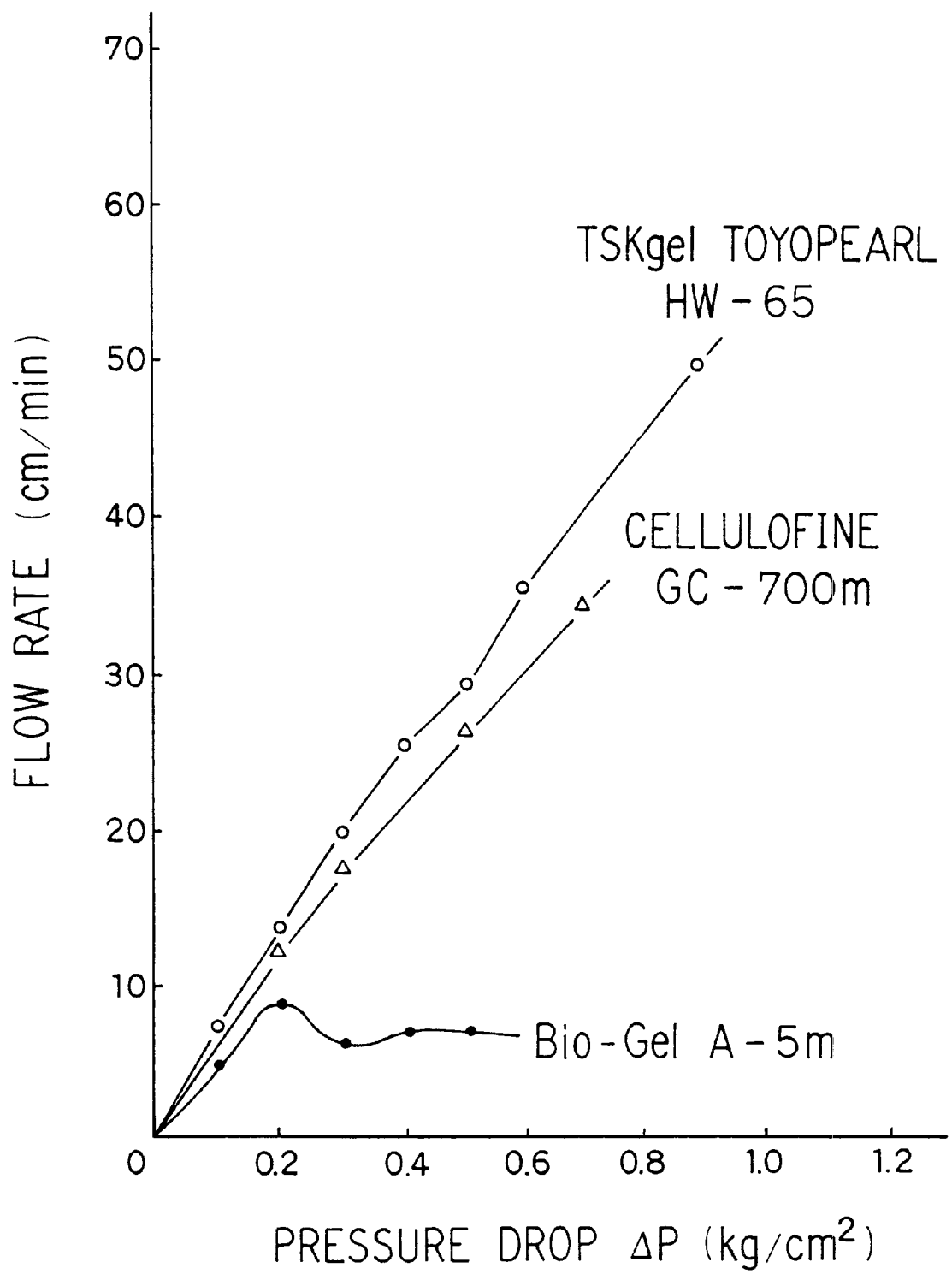
FIG. 2 is a graph showing a relation between a flow rate and a pressure loss ΔP obtained in Reference Example, mentioned later.

As shown in FIG. 2, it is found that each flow rate in TSKgel TOYOPEARL HW-65 and CELLULOFINE GC-700m increases nearly in proportion to increase of pressure, but Bio-Gel A-5m is consolidated and the flow rate thereof does not increase in proportion to the increase of pressure. In the present invention, the gel wherein the relationship between pressure loss ΔP and flow rate is linear relationship up to 0.3 kg/cm$^2$, as the former, is defined as hard gel.

EXAMPLE 1

Into 170 ml of CELLULOFINE GC-700m which is the cellulose porous hard gel (made by Chisso Corporation, exclusion limit of globular proteins: $4 \times 10^5$) was added water to give 340 ml of total volume. Thereto was added 90 ml of a 2M aqueous solution of sodium hydroxide and the temperature thereof was set at 40° C. Then, thereto was added 31 ml of epichlorohydrin and allowed to react with stirring for 2 hours at 40° C. After the reaction was completed, the obtained mixture was fully washed with water to give epoxidated gel.

To 10 ml of the above epoxidated gel was added 200 mg of n-octylamine (log P=2.90), and the mixture was allowed to stand in a 50 (v/v) % aqueous solution of ethanol at 45° C. for 6 days to react the gel with n-octylamine. After the reaction was completed, the reaction mixture was fully washed with a 50 (v/v) % aqueous solution of ethanol, ethanol, a 50 (v/v) % aqueous solution of ethanol and water in that order to give n-octylamine-immobilized gel.

Each (0.5 ml) of the immobilized gel (the adsorbent of the present invention) and CELLULOFINE GC-700m was incubated at 37° C. for 2 hours with 3 ml of normal human serum supplied with IL-1α (concentration of IL-1α: 3 ng/ml) which was prepared by adding *E. coli*-expressed recombinant human IL-1α (made by R & D systems) to normal human serum (made by DAINIPPON PHARMACEUTICAL CO., LTD.).

Each concentration of IL-1α in supernatants obtained before and after incubation was measured by means of a kit for measuring human IL-1α made by CAYMAN CHEMICAL COMPANY, and then adsorption ratio thereof was calculated. Also, with respect to *E. coli*-expressed recombinant human IL-1β (made by R & D systems), normal human serum supplied with IL-1β was prepared, and then experiment of adsorption was carried out in the same manner as in the experiment for IL-1α. Concentration of IL-1β was measured with a kit for measuring human IL-1β made by R & D systems, and adsorption ratio thereof was calculated.

| | Results | |
|---|---|---|
| | Adsorption ratio (%) of IL-1α | Adsorption ratio (%) of IL-1β |
| CELLULOFINE GC-700m | 0 | 0 |
| n-Octylamine-immobilized gel | 65 | 63 |

EXAMPLE 2

The procedure of Example 1 was repeated except that cetylamine (Σf=7.22) was employed instead of n-octylamine and ethanol was employed as a solvent for reaction of immobilization instead of a 50 (v/v) % aqueous solution of ethanol to give cetylamine-immobilized gel (the adsorbent of the present invention). Thus obtained gel was used to carry out experiment of adsorption in the same manner as in Example 1. Each concentration of IL-1α and IL-1β was measured, and then adsorption ratio thereof was calculated.

| Results | | |
|---|---|---|
| | Adsorption ratio (%) of IL-1α | Adsorption ratio (%) of IL-1β |
| CELLULOFINE GC-700m | 0 | 0 |
| Cetylamine-immobilized gel | 86 | 87 |

EXAMPLE 3

The procedure of Example 1 was repeated except that CELLULOFINE GC-200m (made by Chisso Corporation, exclusion limit of globular proteins: $1.4 \times 10^5$) was employed instead of CELLULOFINE GC-700m to give n-octylamine-immobilized gel (the adsorbent of the present invention). Thus obtained gel was used to carry out experiment of adsorption in the same manner as in Example 1. Each concentration of IL-1α and IL-1β was measured, and then adsorption ratio thereof was calculated.

| Results | | |
|---|---|---|
| | Adsorption ratio (%) of IL-1α | Adsorption ratio (%) of IL-1β |
| CELLULOFINE GC-200m | 0 | 0 |
| n-Octylamine-immobilized gel | 68 | 70 |

EXAMPLE 4

The procedure of Example 1 was repeated except that CELLULOFINE GC-200m was employed instead of CELLULOFINE GC-700m and cetylamine was employed instead of n-octylamine to give cetylamine-immobilized gel (the adsorbent of the present invention). Thus obtained gel was used to carry out experiment of adsorption in the same manner as in Example 1. Each concentration of IL-1α and IL-1β was measured and adsorption ratio thereof was calculated.

| Results | | |
|---|---|---|
| | Adsorption ratio (%) of IL-1α | Adsorption ratio (%) of IL-1β |
| CELLULOFINE GC-200m | 0 | 0 |
| Cetylamine-immobilized gel | 90 | 91 |

COMPARITIVE EXAMPLE 1

The procedure of Example 1 was repeated except that n-butylamine (log P=0.97) was employed instead of n-octylamine to give n-butylamine-immobilized gel.

Thus obtained gel was used to carry out experiment of adsorption in the same manner as in Example 1. Each concentration of IL-1α and IL-1β was measured, and then adsorption ratio thereof was calculated.

| Results | | |
|---|---|---|
| | Adsorption ratio (%) of IL-1α | Adsorption ratio (%) of IL-1β |
| CELLULOFINE GC-700m | 0 | 0 |
| n-Butylamine-immobilized gel | 2 | 1 |

COMPARITIVE EXAMPLE 2

The procedure of Example 1 was repeated except that n-hexylamine (log P=2.06) was employed instead of n-octylamine to give n-hexylamine-immobilized gel. Thus obtained gel was used to carry out experiment of adsorption in the same manner as in Example 1. Each concentration of IL-1α and IL-1β was measured, and then adsorption ratio thereof was calculated.

| Results | | |
|---|---|---|
| | Adsorption ratio (%) of IL-1α | Adsorption ratio (%) of IL-1β |
| CELLULOFINE GC-700m | 0 | 0 |
| n-Hexylamine-immobilized gel | 3 | 3 |

EXAMPLE 5

Each (0.5 ml) of the n-octylamine-immobilized gel (the adsorbent of the present invention) obtained in the same manner as in Example 1 and CELLULOFINE GC-700m was incubated at 37° C. for 2 hours with 3 ml of normal human serum supplied with IL-6 (concentration of IL-6: 0.42 ng/ml) which was prepared by adding Chinese Hamster Ovary cell-derived recombinant human IL-6 (made by Genzyme Corporation) to normal human serum (made by DAINIPPON PHARMACEUTICAL CO., LTD.).

Each concentration of IL-6 in supernatants obtained before and after incubation was measured by means of a kit for measuring human IL-6 made by BIOSOURCE INTERNATIONAL, and then adsorption ratio thereof was calculated.

| Results | Adsorption ratio (%) |
|---|---|
| CELLULOFINE GC-700m | 0 |
| n-Octylamine-immobilized gel | 63 |

EXAMPLE 6

The procedure of Example 1 was repeated except that cetylamine ($\Sigma f=7.22$) was employed instead of n-octylamine and ethanol was employed as a solvent for reaction of immobilization instead of a 50 (v/v) % aqueous solution of ethanol to give cetylamine-immobilized gel (the adsorbent of the present invention). Thus obtained gel was used to carry out experiment of adsorption in the same manner as in Example 5. Concentration of IL-6 was measured, and then adsorption ratio thereof was calculated.

| Results | Adsorption ratio (%) |
|---|---|
| CELLULOFINE GC-700m | 0 |
| Cetylamine-immobilized gel | 90 |

EXAMPLE 7

The procedure of Example 1 was repeated except that CELLULOFINE GC-200m was employed instead of CELLULOFINE GC-700m to give n-octylamine-immobilized gel (the adsorbent of the present invention). Thus obtained gel was used to carry out experiment of adsorption in the same manner as in Example 5. Concentration of IL-6 was measured, and then adsorption ratio thereof was calculated.

| Results | Adsorption ratio (%) |
|---|---|
| CELLULOFINE GC-200m | 0 |
| n-Octylamine-immobilized gel | 67 |

EXAMPLE 8

The procedure of Example 1 was repeated except that CELLULOFINE GC-200m was employed instead of CELLULOFINE GC-700m and cetylamine was employed instead of n-octylamine to give cetylamine-immobilized gel (the adsorbent of the present invention). Thus obtained gel was used to carry out experiment of adsorption in the same manner as in Example 5. Concentration of IL-6 was measured and adsorption ratio thereof was calculated.

| Results | Adsorption ratio (%) |
|---|---|
| CELLULOFINE GC-200m | 0 |
| Cetylamine-immobilized gel | 96 |

COMPARATIVE EXAMPLE 3

The procedure of Comparative Example 1 was repeated to give n-butylamine-immobilized gel. Thus obtained gel was used to carry out experiment of adsorption in the same manner as in Example 5. Concentration of IL-6 was measured, and then adsorption atio thereof was calculated.

| Results | Adsorption ratio (%) |
|---|---|
| CELLULOFINE GC-700m | 0 |
| n-Butylamine-immobilized gel | 1 |

COMPARATIVE EXAMPLE 4

The procedure of Comparative Example 2 was repeated to give n-hexylamine-immobilized gel. Thus obtained gel was used to carry out experiment of adsorption in the same manner as in Example 5. Concentration of IL-6 was measured, and then adsorption ratio thereof was calculated.

| Results | Adsorption ratio (%) |
|---|---|
| CELLULOFINE GC-700m | 0 |
| n-Hexylamine-immobilized gel | 4 |

EXAMPLE 9

Each (0.5 ml) of the n-octylamine-immobilized gel (the adsorbent of the present invention) obtained in the same manner as in Example 1 and CELLULOFINE GC-700m was incubated at 37° C. for 2 hours with 3 ml of normal human serum supplied with IL-2 (concentration of IL-2: 0.81 ng/ml) which was prepared by adding $E.$ $coli$-expressed recombinant human IL-2 (made by Becton Dickinson Labware) to 80 ml of normal human serum (made by DAINIPPON PHARMACEUTICAL CO., LTD.).

Each concentration of IL-2 in supernatants obtained before and after incubation was measured by means of a kit for measuring human IL-2 made by R & D systems, and then adsorption ratio thereof was calculated.

| Results | Adsorption ratio (%) |
|---|---|
| CELLULOFINE GC-700m | 0 |
| n-Octylamine-immobilized gel | 60 |

EXAMPLE 10

The procedure of Example 9 was repeated except that cetylamine ($\Sigma f=7.22$) was employed instead of n-octylamine and ethanol was employed as a solvent for reaction of immobilization instead of a 50 (v/v) % aqueous solution of ethanol to give cetylamine-immobilized gel (the adsorbent of the present invention). Thus obtained gel was used to carry out experiment of adsorption in the same manner as in Example 9. Concentration of IL-2 was measured, and then adsorption ratio thereof was calculated.

| Results | |
|---|---|
| | Adsorption ratio (%) |
| CELLULOFINE GC-700m | 0 |
| Cetylamine-immobilized gel | 82 |

EXAMPLE 11

The procedure of Example 9 was repeated except that CELLULOFINE GC-200m was employed instead of CELLULOFINE GC-700m to give n-octylamine-immobilized gel (the adsorbent of the present invention). Thus obtained gel was used to carry out experiment of adsorption in the same manner as in Example 9. Concentration of IL-2 was measured, and then adsorption ratio thereof was calculated.

| Results | |
|---|---|
| | Adsorption ratio (%) |
| CELLULOFINE GC-200m | 0 |
| n-Octylamine-immobilized gel | 66 |

EXAMPLE 12

The procedure of Example 9 was repeated except that CELLULOFINE GC-200m was employed instead of CEL- LULOFINE GC-700m and cetylamine was employed instead of n-octylamine to give cetylamine-immobilized gel (the adsorbent of the present invention). Thus obtained gel was used to carry out experiment of adsorption in the same manner as in Example 9. Concentration of IL-2 was measured and adsorption ratio thereof was calculated.

Results

| | Adsorption ratio (%) |
|---|---|
| CELLULOFINE GC-200m | 0 |
| Cetylamine-immobilized gel | 85 |

COMPARATIVE EXAMPLE 5

The procedure of Example 9 was repeated except that n-butylamine (log P=0.97) was employed instead of n-octylamine to give n-butylamine-immobilized gel. Thus obtained gel was used to carry out experiment of adsorption in the same manner as in Example 9. Concentration of IL-2 was measured, and then adsorption ratio thereof was calculated.

Results

| | Adsorption ratio (%) |
|---|---|
| CELLULOFINE GC-700m | 0 |
| n-Butylamine-immobilized gel | 0 |

COMPARATIVE EXAMPLE 6

The procedure of Example 9 was repeated except that n-hexylamine (log P=2.06) was employed instead of n-octylamine to give n-hexylamine-immobilized gel. Thus obtained gel was used to carry out experiment of adsorption in the same manner as in Example 9. Concentration of IL-2 was measured, and then adsorption ratio thereof was calculated.

Results

| | Adsorption ratio (%) |
|---|---|
| CELLULOFINE GC-700m | 0 |
| n-Hexylamine-immobilized gel | 0 |

EXAMPLE 13

Each (0.5 mg) of the n-octylamine-immobilized gel (the adsorbent of the present invention) obtained in the same manner as in Example 1 and CELLULOFINE GC-700m was incubated at 37° C. for 2 hours with 3 ml of normal human serum supplied with IL-8 (concentration of IL-8: 7.4 ng/ml) which was prepared by adding E. coli-expressed recombinant human IL-8 (made by R & D systems) to normal human serum (made by DAINIPPON PHARMACEUTICAL CO., LTD.).

Each concentration of IL-8 in supernatants obtained before and after incubation was measured by means of a kit for measuring human IL-8 made by R & D systems, and then adsorption ratio thereof was calculated.

Results

| | Adsorption ratio (%) |
|---|---|
| CELLULOFINE GC-700m | 0 |
| n-Octylamine-immobilized gel | 35 |

EXAMPLE 14

The procedure of Example 13 was repeated except that cetylamine ($\Sigma f$=7.22) was employed instead of n-octylamine and ethanol was employed as a solvent for reaction of immobilization instead of a 50 (v/v) % aqueous solution of ethanol to give cetylamine-immobilized gel (the adsorbent of the present invention). Thus obtained gel was used to carry out experiment of adsorption in the same manner as in Example 13. Concentration of IL-8 was measured, and then adsorption ratio thereof was calculated.

Results

| | Adsorption ratio (%) |
|---|---|
| CELLULOFINE GC-700m | 0 |
| Cetylamine-immobilized gel | 88 |

EXAMPLE 15

The procedure of Example 13 was repeated except that CELLULOFINE GC-200m was employed instead of CELLULOFINE GC-700m to give n-octylamine-immobilized gel (the adsorbent of the present invention). Thus obtained gel was used to carry out experiment of adsorption in the same manner as in Example 13. Concentration of IL-8 was measured, and then adsorption ratio thereof was calculated.

Results

| | Adsorption ratio (%) |
|---|---|
| CELLULOFINE GC-200m | 0 |
| n-Octylamine-immobilized gel | 51 |

EXAMPLE 16

The procedure of Example 13 was repeated except that CELLULOFINE GC-200m was employed instead of CELLULOFINE GC-700m and cetylamine was employed instead of n-octylamine to give cetylamine-immobilized gel (the adsorbent of the present invention). Thus obtained gel was used to carry out experiment of adsorption in the same manner as in Example 13. Concentration of IL-8 was measured and adsorption ratio thereof was calculated.

Results

| | Adsorption ratio (%) |
|---|---|
| CELLULOFINE GC-200m | 0 |
| Cetylamine-immobilized gel | 93 |

COMPARATIVE EXAMPLE 7

The procedure of Example 13 was repeated except that n-butylamine (log P=0.97) was employed instead of n-octylamine to give n-butylamine-immobilized gel. Thus obtained gel was used to carry out experiment of adsorption in the same manner as in Example 13. Concentration of IL-8 was measured, and then adsorption ratio thereof was calculated.

Results

| | Adsorption ratio (%) |
|---|---|
| CELLULOFINE GC-700m | 0 |
| n-Butylamine-immobilized gel | 0 |

COMPARATIVE EXAMPLE 8

The procedure of Example 13 was repeated except that n-hexylamine (log P=2.06) was employed instead of n-octylamine to give n-hexylamine-immobilized gel. Thus obtained gel was used to carry out experiment of adsorption in the same manner as in Example 13. Concentration of IL-8 was measured, and then adsorption ratio thereof was calculated.

Results

| | Adsorption ratio (%) |
|---|---|
| CELLULOFINE GC-700m | 0 |
| n-Hexylamine-immobilized gel | 2 |

EXAMPLE 17

Into 170 ml of CELLULOFINE GC-700m which is the cellulose porous hard gel was added water to give 340 ml of total volume. Thereto was added 90 ml of a 2M aqueous solution of sodium hydroxide and the temperature thereof was set at 40° C. Then, thereto was added 31 ml of epichlorohydrin and allowed to react with stirring for 2 hours at 40° C. After the reaction was completed, the obtained mixture was fully washed with water to give epoxidated gel.

To 10 ml of the above epoxidated gel was added 200 mg of n-octylamine (log P=2.90), and the mixture was allowed to stand in a 50 (v/v) % aqueous solution of ethanol at 45° C. for 6 days to react the gel with n-octylamine. After the reaction was completed, the reaction mixture was fully washed with a 50 (v/v) % aqueous solution of ethanol, ethanol, a 50 (v/v) % aqueous solution of ethanol and water in that order to give n-octylamine-immobilized gel.

Each (0.5 ml) of the immobilized gel (the adsorbent of the present invention) and CELLULOFINE GC-700m was incubated at 37° C. for 2 hours with 3 ml of normal human serum supplied with TNFα (concentration of TNFα: 7.4 ng/ml) which was prepared by adding E. coli-expressed recombinant human TNFα (made by R & D systems) to normal human serum (made by DAINIPPON PHARMACEUTICAL CO., LTD.).

Each concentration of TNFα in supernatants obtained before and after incubation was measured by means of a kit for measuring human TNFα (made by BIOSOURCE INTERNATIONAL), and then adsorption ratio thereof was calculated.

Results

| | Adsorption ratio (%) |
|---|---|
| CELLULOFINE GC-700m | 0 |
| n-Octylamine-immobilized gel | 43 |

EXAMPLE 18

The procedure of Example 17 was repeated except that cetylamine ($\Sigma f=7.22$) was employed instead of n-octylamine and ethanol was employed as a solvent for reaction of immobilization instead of a 50 (v/v) % aqueous solution of ethanol to give cetylamine-immobilized gel (the adsorbent of the present invention). Thus obtained gel was used to carry out experiment of adsorption in the same manner as in Example 17. Concentration of TNFα was measured, and then adsorption ratio thereof was calculated.

Results

| | Adsorption ratio (%) |
|---|---|
| CELLULOFINE GC-700m | 0 |
| Cetylamine-immobilized gel | 85 |

EXAMPLE 19

The procedure of Example 17 was repeated except that CELLULOFINE GC-200m was employed instead of CELLULOFINE GC-700m to give n-octylamine-immobilized gel (the adsorbent of the present invention). Thus obtained gel was used to carry out experiment of adsorption in the same manner as in Example 17. Concentration of TNFα was measured, and then adsorption ratio thereof was calculated.

Results

| | Adsorption ratio (%) |
|---|---|
| CELLULOFINE GC-200m | 0 |
| n-Octylamine-immobilized gel | 55 |

EXAMPLE 20

The procedure of Example 17 was repeated except that CELLULOFINE GC-200m was employed instead of CELLULOFINE GC-700m and cetylamine was employed instead of n-octylamine to give cetylamine-immobilized gel (the adsorbent of the present invention). Thus obtained gel was used to carry out experiment of adsorption in the same manner as in Example 17. Concentration of TNFα was measured and adsorption ratio thereof was calculated.

Results

| | Adsorption ratio (%) |
|---|---|
| CELLULOFINE GC-200m | 0 |
| Cetylamine-immobilized gel | 91 |

COMPARATIVE EXAMPLE 9

The procedure of Example 17 was repeated except that n-butylamine (log P=0.97) was employed instead of n-octylamine to give n-butylamine-immobilized gel. Thus obtained gel was used to carry out experiment of adsorption in the same manner as in Example 17. Concentration of TNFα was measured, and then adsorption ratio thereof was calculated.

| Results | |
|---|---|
| | Adsorption ratio (%) |
| CELLULOFINE GC-700m | 0 |
| n-Butylamine-immobilized gel | 0 |

COMPARATIVE EXAMPLE 10

The procedure of Example 17 was repeated except that n-hexylamine (log P=2.06) was employed instead of n-octylamine to give n-hexylamine-immobilized gel. Thus obtained gel was used to carry out experiment of adsorption in the same manner as in Example 17. Concentration of TNFα was measured, and then adsorption ratio thereof was calculated.

| Results | |
|---|---|
| | Adsorption ratio (%) |
| CELLULOFINE GC-700m | 0 |
| n-Hexylamine-immobilized gel | 5 |

In addition to the ingredients used in the Examples, other ingredients can be used in the Examples as set forth in the specification to obtain substantially the same results.

What is claim is:

1. A process for removing at least one protein selected from the group consisting of interleukin-1, interleukin-2, interleukin-6, and and tumor necrosis factor in body fluid, which comprises bringing the body fluid into contact with an adsorbent for removing at least one protein selected from the group consisting of interleukin-1, interleukin-2, interleukin-6, interleukin-8 and tumor necrosis factor, which comprises a porous water-insoluble carrier and a compound satisfying the value of log P of at least 2.50, in which P is a distribution coefficient in an octanol-water system and being immobilized onto the carrier.

2. The process of claim 1, wherein the porous water-insoluble carrier is hydrophilic.

3. The process of claim 1, wherein the molecular weight of exclusion limit of the porous water-insoluble carrier is from $5 \times 10^3$ to $6 \times 10^5$.

4. The process of claim 1, wherein the porous water-insoluble carrier is a carrier comprised of porous cellulose gel.

5. The process of claim 1, which comprises charging the adsorbent into a column which has an inlet and an outlet for fluid and is equipped with a means preventing the adsorbent from effusing outside of the column but allowing the fluid to pass at the outlet; and then passing body fluid through the column.

\* \* \* \* \*